United States Patent [19]

Wade

[11] Patent Number: 4,768,359
[45] Date of Patent: Sep. 6, 1988

[54] WHEEL LOCK

[76] Inventor: Mark W. Wade, 3667 Quentin Ave., Boynton Beach, Fla. 33436

[21] Appl. No.: 67,396

[22] Filed: Jun. 26, 1987

Related U.S. Application Data

[63] Continuation of Ser. No. 891,294, Jul. 31, 1986, abandoned.

[51] Int. Cl.⁴ ............................................. B62H 5/16
[52] U.S. Cl. ............................................ 70/14; 70/226
[58] Field of Search ............... 70/14, 18, 19, 54–56, 70/225, 226, 211, 212, 237

[56] References Cited

U.S. PATENT DOCUMENTS

| Re. 24,712 | 10/1959 | Marugg | 70/225 |
|---|---|---|---|
| 577,673 | 2/1897 | Wickliffe | 70/18 |
| 1,488,893 | 4/1924 | Plouffe | 70/226 |
| 1,504,220 | 8/1924 | Degen | 70/226 X |
| 1,589,233 | 6/1926 | Schneider et al. | 70/226 |
| 2,960,857 | 11/1960 | Winter | 70/225 |
| 3,550,409 | 12/1970 | Pariser | 70/212 X |
| 3,664,164 | 5/1972 | Zaidener | 70/14 X |
| 3,783,657 | 1/1974 | Foote | 70/54 X |
| 3,805,564 | 4/1974 | Velardo | 70/18 |
| 4,175,410 | 11/1979 | Schwaiger | 70/226 |
| 4,372,136 | 2/1983 | Mickelson | 70/14 |
| 4,441,586 | 4/1984 | Bernier | 70/225 X |
| 4,570,470 | 2/1986 | Gray | 70/212 X |
| 4,622,833 | 11/1986 | Shepherd | 70/226 |

FOREIGN PATENT DOCUMENTS

| 402771 | 4/1970 | Australia | 70/212 |
|---|---|---|---|
| 2718291 | 10/1978 | Fed. Rep. of Germany | 70/226 |
| 2106058 | 4/1983 | United Kingdom | 70/226 |
| 2110175 | 6/1983 | United Kingdom | 70/14 |
| 2110293 | 6/1983 | United Kingdom | 70/54 |

Primary Examiner—Lloyd A. Gall
Attorney, Agent, or Firm—Victor F. Volk

[57] ABSTRACT

An effective vehicular anti-theft wheel lock is fashioned from two bent bars that can slide reltive to each other with a long extension of one of the bars projecting under the vehicle. Bent portions of the bars grip the wheel rim and means are provided for locking the bars together, as wtih a padlock shackle may be protected against bolt cutters by a grooved block.

4 Claims, 1 Drawing Sheet

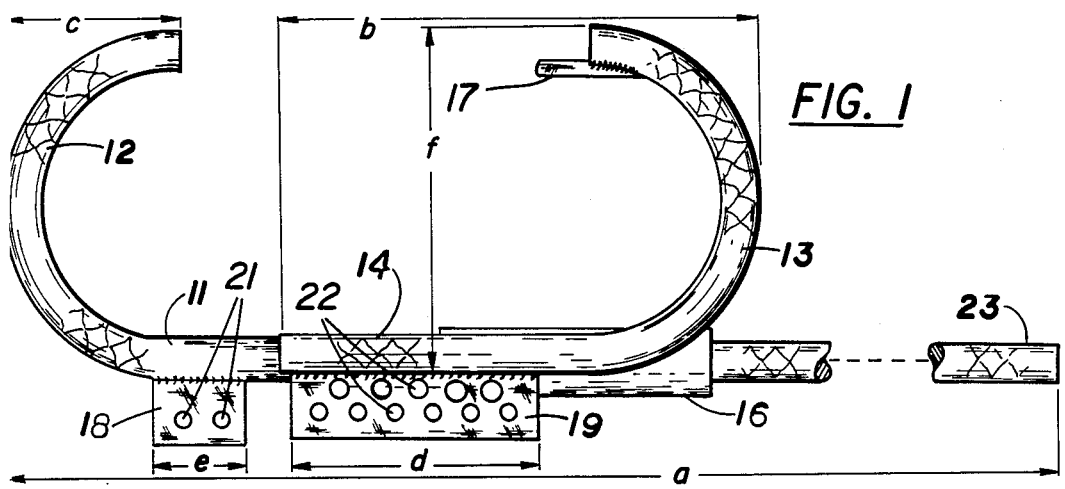
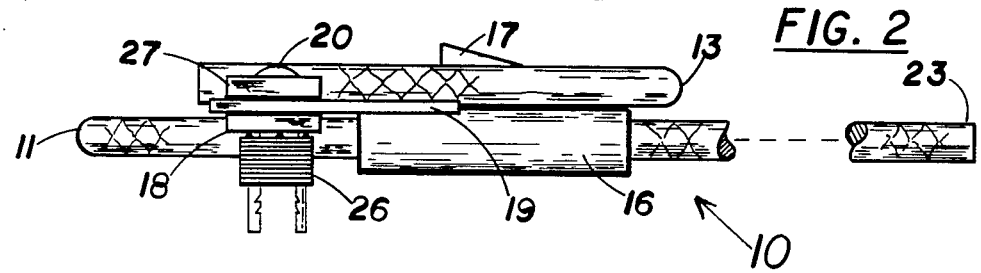
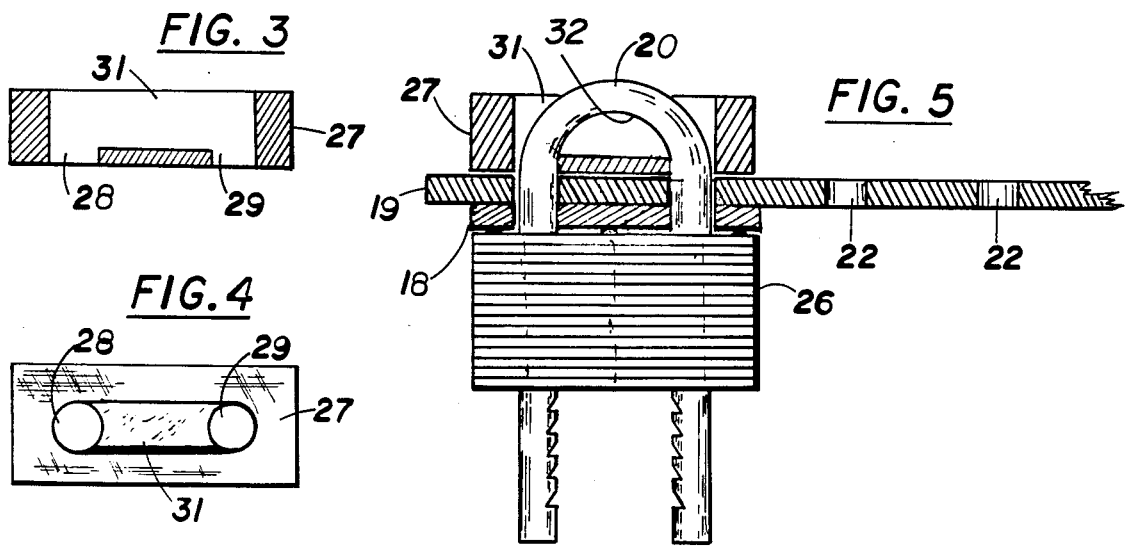
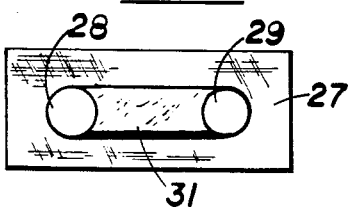
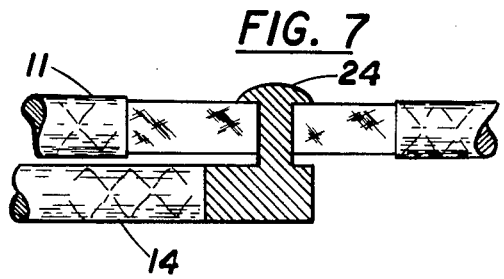

WHEEL LOCK

This application is a continuation of application Ser. No. 891,294, filed 7-31-86, now abandoned.

BACKGROUND OF THE INVENTION

Although it has long been known that there is a great need for practical means to prevent the theft of vehicles, such as automobiles, trailers, bicycles and etc. no such means has been generally adopted and the problem of theft remains to be solved. Among the means devised to prevent automobile thefts have been a number of wheel locks but none of these has come into general use. A recent professional search of the Patent and Trademark Office files for such devices has brought forth U.S. Pat. Nos. 1,499,883 to Chadwick et al., 2,960,857 to Winter, 3,828,590 to Thiebault, 4,164,131 to Desmond, 4,441,586 to Bermler, and Re. 24,712 to Marugg. All of these patents define hinged clamps for the wheel rim, which, in this application, is understood to include the tire, that are locked by some form of bolt near the clamp hinge to draw the arms of the clamp together. They act as chocks, and in order to be effective, must be massive and bulky. Even so, by driving very slowly a car or other vehicle, such as a trailer, can be moved with one of these chock devices on the wheel. Moreover, these hinged clamps can fit properly onto a single width of tire tread.

There still remains the need for an inexpensive, light weight device that will provide positive means to prevent the turning of a vehicle wheel, will fit widely different rim (including tire) widths and, in addition, will be very difficult for a thief to dismantle or remove.

SUMMARY

My device for locking the wheel of a vehicle comprises two bar members, each of which comprises a curvilinear length of itself, and means for interlocking them with the curvilinear lengths facing each other so as to lockingly engage a rim, which may include a tire, of the wheel. At least one of these bar members has an extension that, in use, projects under the vehicle thereby preventing a full rotation of the wheel.

To lock the bar members together, one or both may, advantageously, comprise plates that are rigidly fixed to them and have alignable openings, preferably spaced to accept both legs of a padlock shackle. One of the curvilinear lengths may advantageously terminate in a flat portion that will fit between the wheel and a brake drum. Advantageously, a tubular member fixed to one of the bar members slidably encloses the other bar member to permit adjustment of the curvilinear lengths to a good fit around the wheel rim.

I have invented a means that is proof against bolt-cutters, for locking together two plates with a padlock shackle when the shackle fits through two aligned holes in the plates. This means comprises a block defining two holes alignable with the aligned holes in the plates, and walls that define a groove in the block between the two holes. This groove has a depth sufficient to accept the shackle so as to expose no more than about half the thickness of the shackle stock. A thickness of the block is retained under the groove sufficient to bring the plates against the padlock when the shackle is passed through the block and the plates, and pressed into the padlock to lock it.

BRIEF DESCRIPTION OF THE DRAWINGS

FIG. 1 shows a side view of the device of my invention.

FIG. 2 shows a bottom view of the device of FIG. 1 with a padlock in place.

FIG. 3 shows a side view in section of the bolt-cutter-proofing block of my invention.

FIG. 4 shows a top view of the block of FIG. 3.

FIG. 5 shows a side view, with plates in section, of a locked assembly employing the block of my invention.

FIG. 6 shows a perspective view of an automobile with a front wheel locked by the device of my invention.

FIG. 7 is a section showing an alternative means of obtaining a slide fit in my device.

DETAILED DESCRIPTION OF PREFERRED EMBODIMENTS

In my locking device 10 a bar 11 has a curved length 12 which faces another curved length 13 of another bar 14. A pipe length 16 is welded to the bar 14 and the bar 11 is enclosed in this pipe length 16 and thereby is slidable back and forth relative to the bar 14 so as to adjust the size of an enclosure made by the two curved lengths 12, 13. By this means my new device is readily applied to different tire tread widths. A short flat portion in the form of a plate 17 is welded to the curved length 13 to obtain a better grip on an automobile wheel, where applicable, by fitting between the brake drum and the wheel.

A plate 18 is welded to the bar 11 adjacent the curved portion 12 thereof and another plate 19 is welded to a straight portion of the bar 14. Openings 21 through the plate 18 are spaced to accept two legs of a padlock shackle 20 (FIG. 5) and can be aligned with openings 22 through the plate 19 by sliding the bar 11 in the pipe 16. The bar 11 is considerably longer than the bar 14 due to an extension 23 of its length. When the device 10 is clamped on the wheel of an automobile (FIG. 6) it is the extension 23 that projects under the vehicle to which the wheel is attached.

My bars 11, 14 are formed of $\frac{3}{4}$ inch or $\frac{5}{8}$ inch case-hardened commercial steel concrete reinforcing bar for use in locking automobile or trailer wheels. Lighter bars may be used for the smaller wheels of lawn mowers, bicycles, and the like; but I have found that reinforcing bar is an ideal material for my purpose since it is very tough and non-brittle, readily available, and inexpensive. Other materials such as stainless and other alloy steel can, however, be used within the scope of my invention. I have shown the parts 17, 16, 18 and 19 to be welded to the bars 11 and 14, but they may be integral with the bars and formed by forging, particularly if the bars are flat, rather than round, which they may be, within the scope of my invention.

Although I have found it economical and practical to use the pipe length 16 to obtain a sliding fit between the two bars the element 16 does not necessarily have to completely surround the bar 11 so long as it confines it, and, of course, the section of the tubular member or pipe 16 is not necessarily circular. Other means of obtaining a slide fit will come within the scope of my invention such as that shown in FIG. 7 where bar 11 is slotted to fit a headed bolt 24 connected to the bar 14.

While my device allows of considerable latitude in dimensions and I do not wish to be limited to the dimensions shown, I have found that, for a locking device for standard automobile wheels with non-sport, summer tires the dimensions, for a device 10 using ⅜ inch reinforcing bar, in inches, as shown in FIG. 1 are approximately as follows:

|   |   | inches |
|---|---|---|
| a. | overall extension of the bar 11 | 19 |
| b. | overall extension of the bar 14 | 12 |
| c. | depth of arcs of curves | 3 |
| d. | length of plate 19 | 7 |
| e. | length of plate 18 | 2 |
| f. | chord of arcs | 7.5 |

To lock the bars in position enclosing a wheel rim a conventional padlock shackle 20 of the type that can be removed completely from the lock itself is passed through two openings in each of the plates 18, 19 that have been lined up. The padlock 26 is then pressed home against the plate 19 as shown in FIG. 2. To prevent the cutting of the shackle 20 with a bolt cutter I have provided the means of FIGS. 3-5 where a block of steel or the like 27 is provided with two holes 28, 29 spaced to match the openings 21 and 22 so as to accept the shackle 20. A groove or channel 31, wide enough to accept the upper arc 32 of the shackle 20 is deep enough so that no more than half of the thickness of the shackle is exposed when the shackle is locked snugly onto the two plates 18, 19 (FIG. 5). As can be seen in FIG. 5 there is no section of the shackle that would be exposed to a bolt cutter. I have found it convenient to keep the block 27 and the shackle 20 together even when the lock is not in use, and this may be done by making the holes 28, 29, and or channel 31 narrow enough for a tight fit on the shackle.

By using only one opening in each of the plates 18, 19 a padlock can be used of the type with one leg of the shackle fixed to the lock body, but I have found it definitely preferable to use the shackle type 20, not only because it permits employment of the bolt cutter proofing block 27, but because the two shackle legs passing through the plates keep them from swinging relative to each other, the lock and the pipe length 16 provide a very firm attachment of my device to a front wheel 33 (FIG. 6) of an automobile 34. Here it can be seen how, when the car starts to move forward the projecting bar extension 23 will come up against the chassis or front axle and create a torque sufficient to cause the motor to stall.

The foregoing description has been exemplary rather than definitive of my invention for which I desire an award of Letters Patent as defined in the appended claims.

I claim:

1. In a vehicle comprising a chassis and a wheel axis under said chassis, locking means comprising:
   (A) a wheel comprising a rim, rotatable on said axis,
   (B) two separate bar members, each comprising a curvilinear length thereof,
   (C) means for slidably adjustably interlocking said bar members with said curvilinear lengths facing each other so as to lockingly engage said rim,
   (D) plates defining alignable openings rigidly affixed along the length of each of said bar members,
   (E) an integral cantilevered extension of one of said bar members, said extension projecting under said chassis substantially parallel to said axis, said extension being free to rotate a substantial distance with said wheel, thereafter striking said chassis and preventing a full rotation of said wheel.

2. The locking means of claim 1 comprising a tubular member rigidly fixed to one of said bar members, the other of said bar members being slidably enclosed by said tubular member.

3. The locking means of claim 1 wherein said openings are spaced to accept both legs of conventional padlock shackles.

4. The locking means of claim 1 wherein one of said curvilinear lengths terminates in a flat portion able to fit between a brake drum and a wheel.

* * * * *